Patented July 13, 1948

2,445,142

UNITED STATES PATENT OFFICE 2,445,142

PREPARATION OF THIOLESTERS

Chester M. Himel, Bartlesville, Okla., assignor to Phillips Petroleum Company, a corporation of Delaware No Drawing. Application February 12, 1946,
Serial No. 647,191

6 Claims. (Cl. 260—455)

This invention relates to a process for the preparation of thiolesters and more particularly thiolesters of tertiary aliphatic mercaptans having 8 or more carbon atoms per molecule. More specifically the invention relates to a method for the synthesis of thiolesters by the interaction of anhydrides of organic monobasic acids with tertiary aliphatic $C_8$ and higher mercaptans.

The principal object of my invention is to provide a novel and useful process for the preparation of thiolesters of tertiary aliphatic $C_8$ and higher mercaptans. Another object is to prepare thiolesters which have improved stability toward saponification reactions and which are useful as plasticizing and modifying agents for synthetic and natual rubbers and resins. Another object is to provide a process for the preparation of thiolesters from tertiary aliphatic $C_8$ and heavier mercaptans and the anhydrides of organic monobasic acids in the presence of acidic type catalysts. Another object is to provide a process which utilizes readily available tertiary aliphatic $C_8$ and higher mercaptans and which also utilizes anhydrides of organic monobasic acids to prepare thiolesters possessing extremely high utility as plasticizers and as chemical intermediates. Many other objects will more fully appear from a consideration of this description.

I have found that thiolesters of tertiary aliphatic $C_8$ and higher mercaptans possess many advantages over the other types of esters when they are employed as plasticizing agents for natural and artificial rubbers, various alkyd resins and numerous other polymeric materials. For example, thiolesters prepared from tertiary aliphatic $C_8$ and higher mercaptans show a remarkable resistance toward hydrolytic reactions while other esters are known to undergo hydrolysis with relative ease. The superiority of the thiolesters made in accordance with the present invention is also manifested in their increased compatibility toward many natural and synthetic resinous materials. While the reasons for these improved properties are not clearly understood, it is probable that the presence of the sulfur atom in the ester structure and also the highly branched nature of the carbon chain of the tertiary aliphatic $C_8$ and higher mercaptans utilized are at least partially responsible for the unexpected properties of the compounds herein described.

The compounds with which this invention is concerned have the general formula

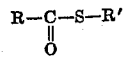

where R may be an alkyl group from methyl to those with long hydrocarbon chains, as well as aralkyl and aryl radicals, and R' is a tertiary alkyl group containing at least 8 carbon atoms.

According to the process of this invention, tertiary aliphatic $C_8$ and higher mercaptans may be readily converted to thiolesters by the interaction of said mercaptans with organic acid anhydrides of monobasic acids in the presence of acidic type catalysts such as sulfuric acid, phosphoric acid, hydrochloric acid, zinc chloride, aluminum chloride, boron fluoride and the like. Although it is well known that tertiary mercaptans show a pronounced tendency to undergo degradative decomposition reactions with cleavage of hydrogen sulfide under the influence of heat or the action of acids, I have found that reaction conditions may be controlled in such a way that thiolester formation is the predominant reaction. Thus, it has been found advisable to carry out the reaction at temperatures sufficiently low to prevent substantially all mercaptan decomposition and at the same time maintain a satisfactory reaction rate. The temperature is regulated to suit the particular reaction system at hand and may vary over a considerable range depending upon both the anhydride and the mercaptan chosen.

I have found that, under the specific conditions chosen and in the presence of acidic type catalysts, a smooth and rapid reaction between tertiary aliphatic $C_8$ and higher mercaptans and organic monobasic acid anhydrides will occur with the resultant formation of thiolesters. Processes have been described for the preparation of thiolesters from mercaptans, particularly the primary mercaptans of relatively low molecular weight, in which it is essential that one of the reaction products be removed as soon as it is formed. Such a separation step is accomplished by azeotropic distillation, fractional distillation, extraction or other means. According to my process satisfactory yields of the desired esters may be obtained in a batchwise operation without the necessity of removing one of the reaction products. Thus the disadvantage of introducing an additional step in the process is eliminated and thereby a marked reduction in operating costs is effected. In my process the reaction mixture is agitated at a controlled temperature and for a sufficient length of time to insure an optimum yield of the thiolester after which the material is water washed, dried and distilled. The process, therefore, provides a convenient and economical method for the synthesis of an important group of sulfur compounds.

The process in one of its more specific embodiments may comprise the slow addition of a tertiary aliphatic C8 or higher mercaptan to a solution containing an acidic type catalyst and an organic acid anhydride of a monobasic acid. The mol ratio of anhydride to mercaptan is generally at least one to one with an excess of the anhydride preferred in order to effect substantially complete conversion of the mercaptan. While it is preferable to use an excess of the anhydride, certain limitations are imposed on account of the cost of said material when large scale operation of the process is practiced. Therefore, the ratio of reactants employed in a given synthesis will be governed by the availability and cost of the materials. Any conventional type reactor provided with a means for stirring or otherwise agitating the reaction mixture is suitable for practicing the present process. Temperatures in the range of 0 to 200° C. are applicable with the somewhat narrower range of 40 to 90° C. being preferred. The temperature chosen is governed largely by the stability and reactivity of the mercaptan being esterified. In general the higher the molecular weight of the mercaptan the lower the reaction temperature utilized. In the interest of operating efficiency, it is important to adjust the reaction conditions so that the ester is formed before appreciable decomposition of the mercaptan occurs. Subsequent to the addition of the tertiary C8 or higher aliphatic mercaptan, the reaction mixture is agitated while the tempeature is held within the optimum range for a period of from about one to about three hours or until the reaction is complete. The product is then water washed, dried and distilled.

The mercaptan intermediates of the present process comprise the tertiary types having from 8 to 20 or more carbon atoms per molecule. While in specialized cases pure individual mercaptans may be desirable, for many purposes commercially available mixtures of isomers are satisfactory. Mixtures of such tertiary mercaptans are now available through the catalytic addition of hydrogen sulfide to selected fractions of isoolefins, especially those made by polymerization of low-boiling olefins, and normally liquid products of thermal and catalytic cracking of petroleum distillates. Preferred methods of making the mercaptans utilized in the process of this invention are set forth in Schulze U. S. Patents 2,392,554 and 2,392,555. In most cases, the tertiary mercaptans are mixtures of isomeric compounds. The following data are representative of the physical properties of some of the tertiary mercaptans from such sources.

*Properties of tertiary mercaptans*

| Fraction | M. W. | Sp. Gr. 60 F./60 F. | Mercaptan Sulfur Content | Distillation Range |
| --- | --- | --- | --- | --- |
| C12 Tertiary mercaptan | 193.3 | 0.8713 | 15.9 | 77.8–97.2/5 mm. |
| C14 Tertiary mercaptan | 230 | 0.877 | 11.9 | 103.3–122.2/5 mm. |
| C8 Tertiary mercaptan | 145 | 0.856 | 21.6 | 149–167° C. |

Other high molecular weight tertiary aliphatic mercaptans which may be utilized in practicing the present invention are: tertiary C10 mercaptan, tertiary hexadecyl mercaptan, tertiary octadecyl mercaptan and tertiary eicosyl mercaptan. Tertiary alkyl mercaptans having more than 20 carbon atoms per molecule may likewise be employed.

Anhydrides which are applicable in the thiolester synthesis herein described range from the low molecular weight anhydrides of aliphatic monobasic acids, such as acetic anhydride, to compounds containing long hydrocarbon chains or branched chains. Anhydrides of aromatic acids, such as benzoic acid and its derivatives, as well as anhydrides containing aralkyl groups are also within the scope of this disclosure.

Catalysts which have been shown to be applicable to the reaction include sulfuric acid, phosphoric acid, hydrogen chloride, hydrogen fluoride, zinc chloride, aluminum chloride, stannic chloride, zinc sulfate, sodium bisulfate, boron fluoride, boron fluoride-phosphoric acid complex, boron fluoride etherate, benzene sulfonic acid and other aromatic sulfonic acids. In the presence of these catalysts, thiolesters can be prepared by reaction of tertiary mercaptans with either aliphatic or aromatic acid anhydrides.

Following are non-limiting specific examples of the practice of my invention.

*Example I*

Tertiary dodecyl thiolacetate was prepared in the following manner: Acetic anhydride (60 parts by weight) and freshly fused zinc chloride (10 parts by weight) were charged in a flask equipped with a stirrer and a thermometer. Tertiary C12 mercaptan (101 parts by weight) was added dropwise maintaining the temperature in the range of 50–60° C. The reaction was held with agitation at 70° C. for one hour after the addition of all of the mercaptan. The product was washed with water, dried, and distilled to give 92 parts by weight of tertiary dodecyl thiolacetate b. 95–105° C./2 mm. The refractive index of the ester was $n_D^{20}$ 1.4780.

*Example II*

Tertiary tetradecyl thiolbutyrate was prepared in the following manner: Benzene sulphonic acid (5 parts by weight) and butyric anhydride (85 parts by weight) were charged to a reaction vessel and tertiary C14 mercaptan was added slowly with agitation while maintaining a temperature of 50° C. Addition of the mercaptan was continued until an amount nearly equal to the stoichiometric equivalent of the butyric anhydride had been added. The resulting mixture was then held at 50° C. with agitation to complete the reaction. After three hours the reaction was washed with aqueous sodium carbonate, with water, was dried and then distilled. The thiolester product (130 parts by weight) distilled at 130–145° C./2 mm.

From the foregoing description it will be seen that my invention provides a simple and economical method of preparing very valuable thiolesters of higher-boiling tertiary aliphatic mercaptans. Many advantages of the process of my invention will be immediately apparent to those skilled in the art. An important advantage is that cheap and readily available raw materials are utilized to give products of high utility in the arts. Another advantage is that no means need be provided for removing a reaction product or products as soon as formed. Another advantage is that the valuable thiolester product is formed before appreciable decomposition of the tertiary mercaptan occurs, whereby a good yield based on the raw material taken is obtained. Numerous other advantages will be appreciated by those skilled in the art.

I claim:

1. The process of preparing a thiolester having the general formula

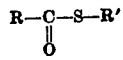

where R is a radical selected from the group consisting of alkyl and aryl radicals having not more than 6 carbon atoms and where R' is a tertiary alkyl radical having at least 8 carbon atoms, which comprises slowly adding a tertiary alkyl mercaptan having at least 8 carbon atoms per molecule to a solution containing an organic acid anhydride of a monobasic organic carboxylic acid having not more than 7 carbon atoms per molecule, and an acidic catalyst, agitating said solution during said addition and maintaining the reaction mixture during said addition at a temperature within the range of from 40 to 90° C., the mol ratio of said anhydride to said mercaptan being slightly greater than one to one, maintaining the resulting mixture at a temperature within the range of from 40 to 90° C. for a period of time of from one to three hours while agitating same, and recovering said thiolester from the resulting mixture.

2. The process of claim 1 wherein said mercaptan has not more than 20 carbon atoms per molecule.

3. The process of claim 1 wherein said organic acid anhydride is acetic anhydride.

4. The process of claim 1 wherein said organic acid anhydride is benzoic anhydride.

5. The process of making tertiary dodecyl thiolacetate which comprises slowly adding tertiary dodecyl mercaptan to a mixture of a major proportion of acetic anhydride and a minor proportion of fused zinc chloride while agitating said mixture and maintaining it at a temperature in the range of 50 to 60° C., continuing addition of said mercaptan only until an amount slightly less than equimolar to said acetic anhydride has been introduced, holding the resulting mixture with agitation at 70° C. for one hour after the addition of said mercaptan has been discontinued, and recovering tertiary dodecyl thiolacetate from the resulting reaction mixture.

6. The process of making tertiary tetradecyl thiolbutyrate which comprises slowly adding tertiary tetradecyl mercaptan to a mixture of a major proportion of butyric anhydride and a minor proportion of benzene sulfonic acid while agitating said mixture and maintaining it at a temperature of 50° C., continuing the addition of said mercaptan only until an amount slightly less than equimolar to said butyric anhydride has been introduced, holding the resulting mixture with agitation at 50° C. for three hours after the addition of said mercaptan has been discontinued, and recovering tertiary tetradecyl thiolbutyrate from the resulting reaction mixture.

CHESTER M. HIMEL.

REFERENCES CITED

The following references are of record in the file of this patent:

UNITED STATES PATENTS

| Number | Name | Date |
| --- | --- | --- |
| 2,212,895 | Allen | Aug. 27, 1940 |
| 2,389,153 | Kendall | Nov. 20, 1945 |

OTHER REFERENCES

Chakravarti, Chemical Abstracts, vol. 21, page 3192 (1927), Abstracting article in Quart. J. Indian Chem. Soc., vol. 4, pages 141–147 (1927).